United States Patent
Kimura

(10) Patent No.: US 7,086,070 B2
(45) Date of Patent: Aug. 1, 2006

(54) OPTICAL PICKUP DEVICE

(75) Inventor: Nobuyuki Kimura, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 10/954,368

(22) Filed: Oct. 1, 2004

(65) Prior Publication Data

US 2005/0105452 A1    May 19, 2005

(30) Foreign Application Priority Data

Oct. 3, 2003    (JP)    ............... 2003-345882

(51) Int. Cl.
*G11B 17/00*    (2006.01)
(52) U.S. Cl. ..................................... 720/682
(58) Field of Classification Search ............... 720/680, 720/681, 682; 369/112.01, 44.14
See application file for complete search history.

(56) References Cited

U.S. PATENT DOCUMENTS

2002/0089917 A1* 7/2002 Sogawa et al. ............. 369/244
2004/0017765 A1* 1/2004 Arase .......................... 369/244
2004/0076107 A1* 4/2004 Sogawa et al. ............. 369/244

FOREIGN PATENT DOCUMENTS

| JP | A-2003-016659 | 1/2003 |
| JP | A-2003-022542 | 1/2003 |
| JP | A-2003-187461 | 7/2003 |

* cited by examiner

*Primary Examiner*—A. J. Heinz
*Assistant Examiner*—Mark Blouin
(74) *Attorney, Agent, or Firm*—Morgan, Lewis & Bockius LLP

(57) ABSTRACT

A light emitting unit A includes a base member 1, a holder 3 for holding a laser diode 7 and a coupling tool 5 which is a leaf spring material. A pair of circular surfaces 32, 32 of the holder 3 are respectively abutted on a pair of flat surfaces 14, 14 of the base member 1 on the overlapping place of the base member 1 and the holder 3. The center axis line of the circular surfaces 32, 32 coincides with a center axis line O passing the light emission point P of the laser diode 7. Projected pieces 55, 55 of the coupling tool are elastically contacted with the laser diode at the back of the center axis line O.

6 Claims, 3 Drawing Sheets

OPTICAL PICKUP DEVICE

BACKGROUND OF THE INVENTION

1. Field of the Invention

The present invention relates to an optical pickup device. Particularly, the present invention relates to an optical pickup device capable of easily positioning in the light emission direction of a laser diode as a light source at the time of assembly.

2. Description of the Related Art

In an optical pickup device for recording and reproducing by scanning a recording surface such as a digital video disc (DVD), the optical system thereof has a plurality of types of optical components such as a collimator lens, a beam splitter, an object lens, a condenser lens and a light-sensitive element provided on an optical axis. A position adjustment operation for matching the light emission direction of the laser diode as a light source to an optical axis ideally arranged is performed at the time of assembly. Various techniques which intend to improve the accuracy and workability of the position adjustment operation are conventionally searched (for instance, see JP-A-2003-022542, JP-A-2003-016659 and JP-A-2003-187461).

Among them, in a technique disclosed in JP-A-2003-022542, a holder holding a laser diode is slidably and rotatably overlapped to a base member via a sphere, and the holder is pressed to the base member by a leaf spring fixed to the base member by a screw. Thereby, the holder is held to the base member, and the inclination of the center of the emission angle distribution to the reference plane of the laser diode can be corrected. The document JP-A-2003-016659 discloses that the inclination angle or the like of a laser diode is adjusted by combining a screw and a leaf. The document JP-A-2003-187461 discloses that the inclination angle of a hologram laser is adjusted with the hologram laser held in a housing via a sphere.

SUMMARY OF THE INVENTION

However, since the laser diode is rotated in not only one direction but also all directions in the operation for correcting the inclination of the center of the emission angle distribution to the reference plane of the laser diode by sliding the sphere and by adjusting the inclination angles of the laser diode and the hologram laser in the prior example, the adjustment thereof is difficult. In addition, a problem exists in that the inclination adjustment operation to the optical axis on which the optical components are ideally arranged becomes very complex since the positions of the light emission points may be changed by the inclination adjustment of the laser diode and the hologram laser.

In the operation for attaching the holder holding the laser diode to the base member by using the leaf spring, a problem exists in that the operation for fixing the leaf spring to the base member by a screw while holding the holder to the base member is extremely troublesome.

The present invention has been accomplished in view of the foregoing. It is one of objects of the present invention to provide an optical pickup device capable of not only adjusting accurately and easily the position of the laser diode to the optical axis on which the optical components are ideally arranged but also accurately and easily adjusting the inclination of the laser diode to the optical axis by absorbing the positional deviation of the light emission point existing in the laser diode only using the leaf spring.

According to a first aspect of the invention, there is provided an optical pickup device including: a base member having receiving surfaces formed on a backside thereof; a holder having abutting portions formed thereon and abuts on the receiving surfaces, and holds a laser diode as a light source and configured to be attached to the backside of the base member, the laser diode being configured to emit a laser beam towards a front side of the base member along an optical axis of other optical components; and a coupling tool includes a leaf spring member that is integrally provided with front locking pieces and rear pressing pieces by which positioning and fixing the base member and the holder by elastically catching the base member and the holder, wherein the base member is positionally adjusted to the optical axis in two axial directions of a longitudinal axis and a lateral axis, the longitudinal axis and the lateral axis both perpendicularly intersect with the optical axis and perpendicularly intersect with each other, wherein the receiving surfaces and the abutting portions are formed in shapes that the abutting portions slide with respect to the receiving surfaces around a center axis line passing the light emission point of the laser diode, the center axis being in parallel with the longitudinal axis, wherein the rear pressing pieces includes projected pieces that press the abutting portions towards the receiving surfaces by elastically contacting with a backside of the laser diode, wherein the leaf spring member includes a pair of plate pieces opposed with each other in a direction of the longitudinal axis, wherein the plate pieces sandwich the base member and the holder and adjust relative position between the base member and the holder in a direction of the longitudinal axis, wherein the projected pieces are provided at both sides of the light emission point of the laser diode, wherein profile lines of the projected pieces where elastically contact to the laser diode are formed in a curved surface, wherein the receiving surfaces are formed in a pair of flat surfaces having a prescribed open angle, and wherein the abutting portions are engaged with the pair of flat surfaces, and have a circular surface obtained by constantly fixing the separating distance from the center axis line.

According to a second aspect of the invention, there is provided an optical pickup device including: a base member having receiving surfaces formed on a backside thereof; a holder having abutting portions formed thereon and abuts on the receiving surfaces, and holds a laser diode as a light source and configured to be attached to the backside of the base member, the laser diode being configured to emit a laser beam towards a front side of the base member along an optical axis of other optical components; and a coupling tool includes a leaf spring member that is integrally provided with front locking pieces and rear pressing pieces by which positioning and fixing the base member and the holder by elastically catching the base member and the holder, wherein the base member is positionally adjusted to the optical axis in two axial directions of a longitudinal axis and a lateral axis, the longitudinal axis and the lateral axis both perpendicularly intersect with the optical axis and perpendicularly intersect with each other, wherein the receiving surfaces and the abutting portions are formed in shapes that the abutting portions slide with respect to the receiving surfaces around a center axis line passing the light emission point of the laser diode, the center axis being in parallel with the longitudinal axis, and wherein the rear pressing pieces includes projected pieces that press the abutting portions towards the receiving surfaces by elastically contacting with a backside of the laser diode.

BRIEF DESCRIPTION OF THE DRAWINGS

The above objects and advantages of the present invention will become more apparent by describing a preferred exemplary embodiment thereof in detail with reference to the accompanying drawings, wherein.

DETAILED DESCRIPTION OF THE PREFERRED EMBODIMENTS

Referring now to the accompanying drawings, a description will be given in detail of preferred embodiments of the invention.

Figure 1A:
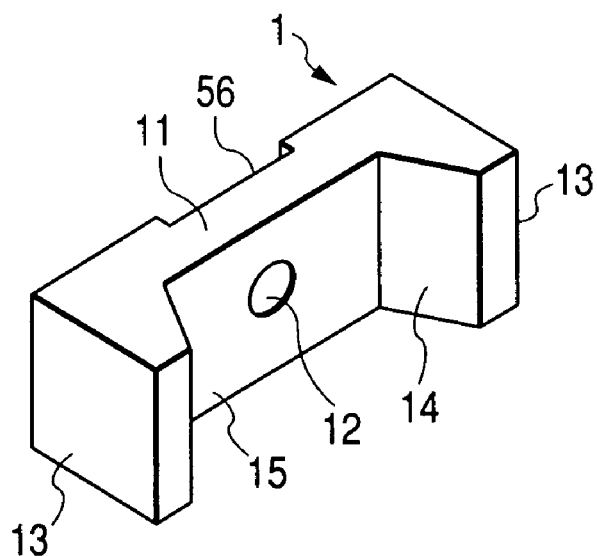
FIG. 1A is a schematic perspective view showing a base member of a light emitting unit used for an optical pickup device according to the present invention.
Figure 1B:
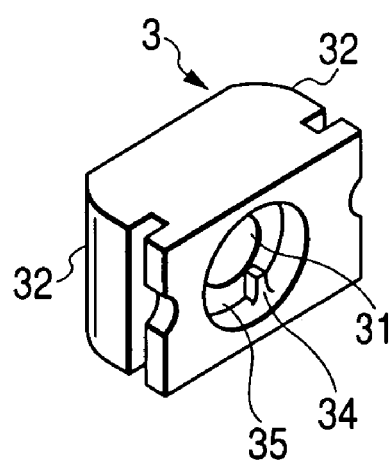
FIG. 1B is a schematic perspective view showing a holder of the light emitting unit.
Figure 1C:
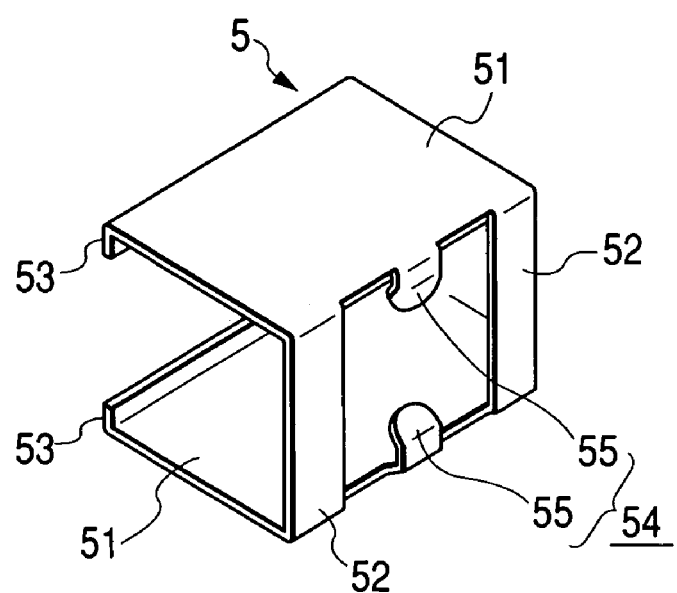
FIG. 1C is a schematic perspective view showing a coupling tool of the light emitting unit.
Figure 2:
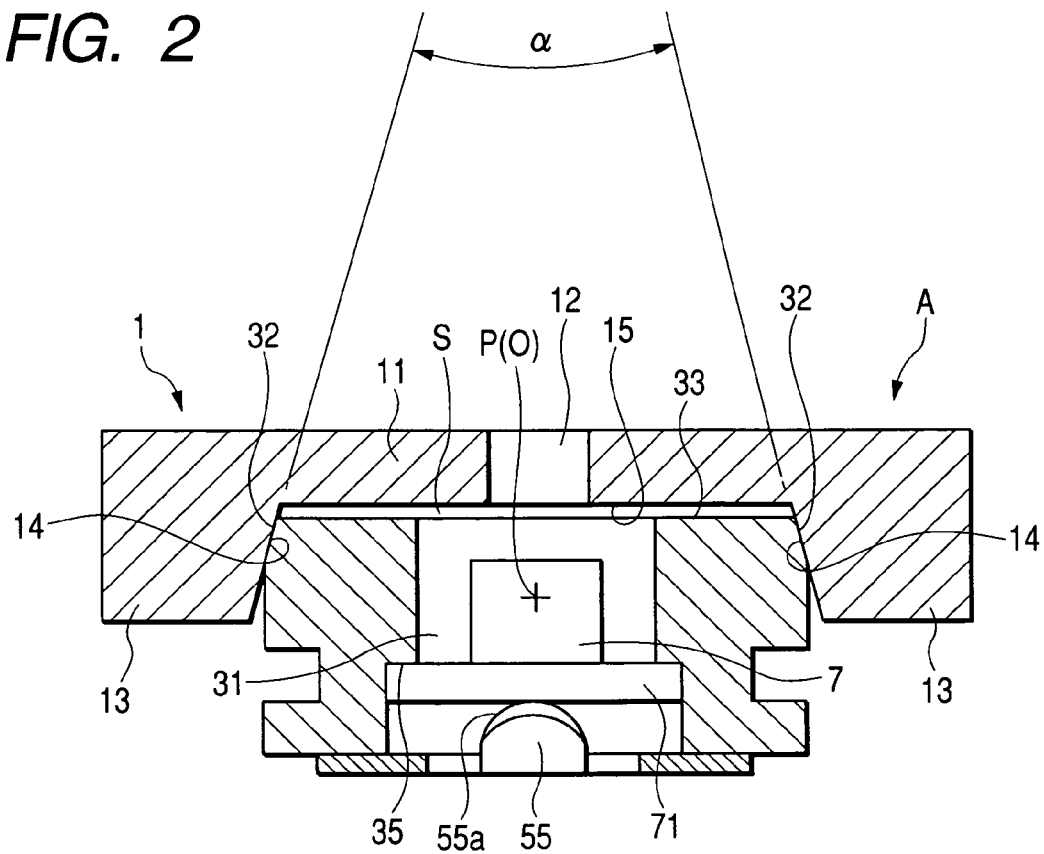
FIG. 2 is a transverse sectional view of the light emitting unit.
Figure 3:
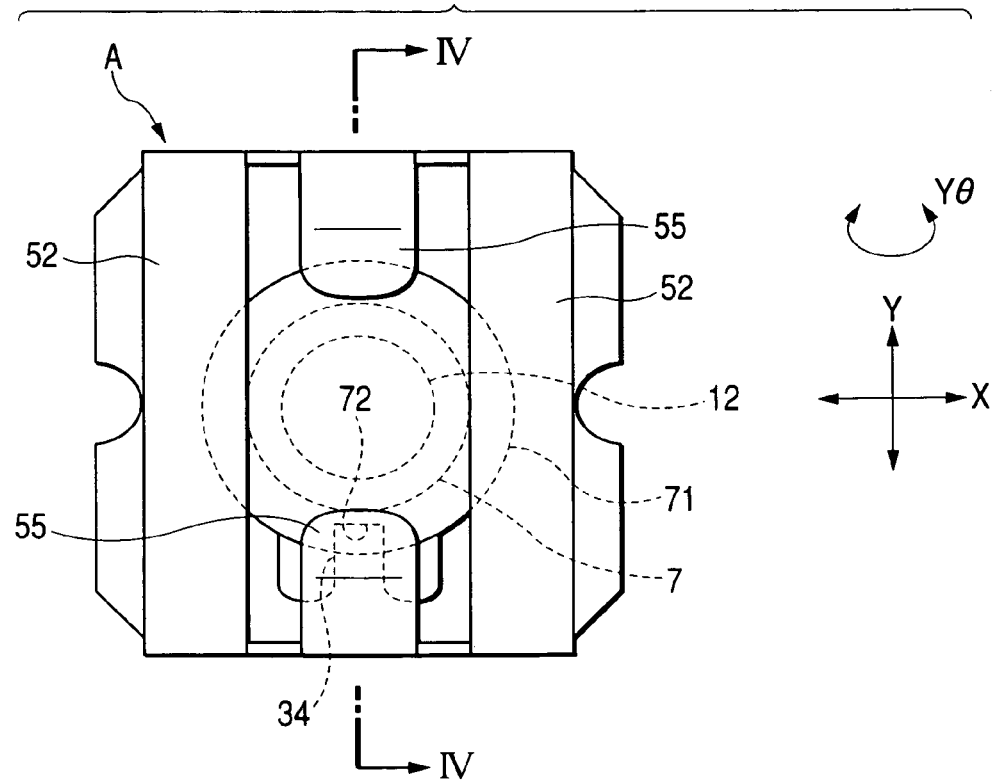
FIG. 3 is a rear view of the light emitting unit.
Figure 4:
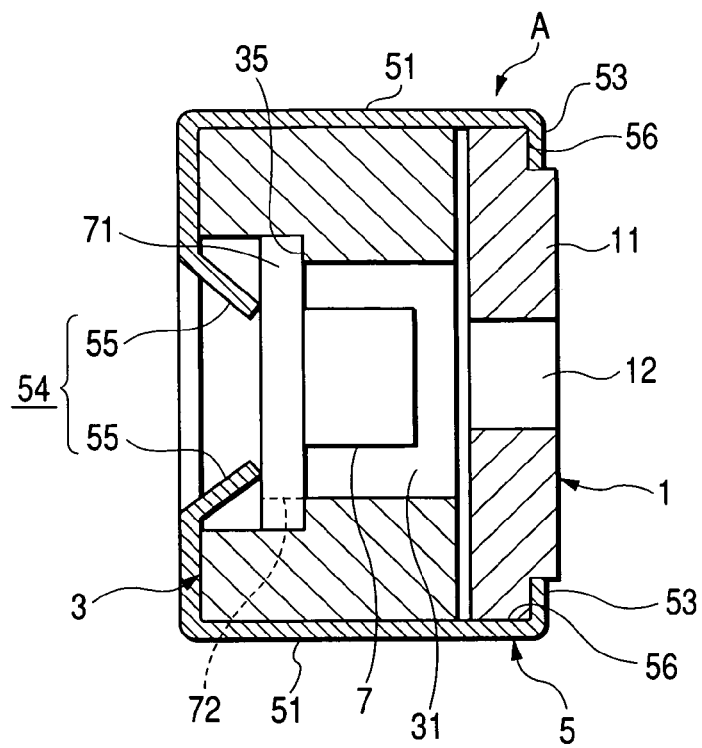
FIG. 4 is a vertical sectional view of FIG. 3 taken along line IV—IV.

FIG. 1A is a schematic perspective view showing a base member 1 of a light emitting unit A used for an optical pickup device according to the present invention. FIG. 1B is a schematic perspective view showing a holder 3 of the light emitting unit. FIG. 1C is a schematic perspective view showing a coupling tool 5 of the light emitting unit. The light emitting unit A is composed by the base member 1, the holder 3 for holding a laser diode 7 and the coupling tool 5. FIG. 2 is a transverse sectional view of the light emitting unit A. FIG. 3 is a rear view of the light emitting unit A. FIG. 4 is a vertical sectional view of FIG. 3 taken along line IV—IV.

The base member 1 has a front wall 11 having an opening 12 for passing an optical beam in the lateral center and sidewalls 13, 13 projecting backward from both the right and left sides of the front wall 11. The right and left sidewalls 13, 13 have a pair of flat surfaces 14, 14 inclined in such a way as widening toward the back. The open angles of the flat surfaces 14, 14 with respect to a flat inner surface 15 of the front wall 11 are made the same. That is, the flat surfaces 14, 14 are formed symmetrically with a virtual plane crossing a center part in the right and left direction of the flat inner surface 15 of the front wall 11 at right angles, and a prescribed open angle α (see FIG. 2) is given between the flat surfaces 14, 14.

Figure 5:
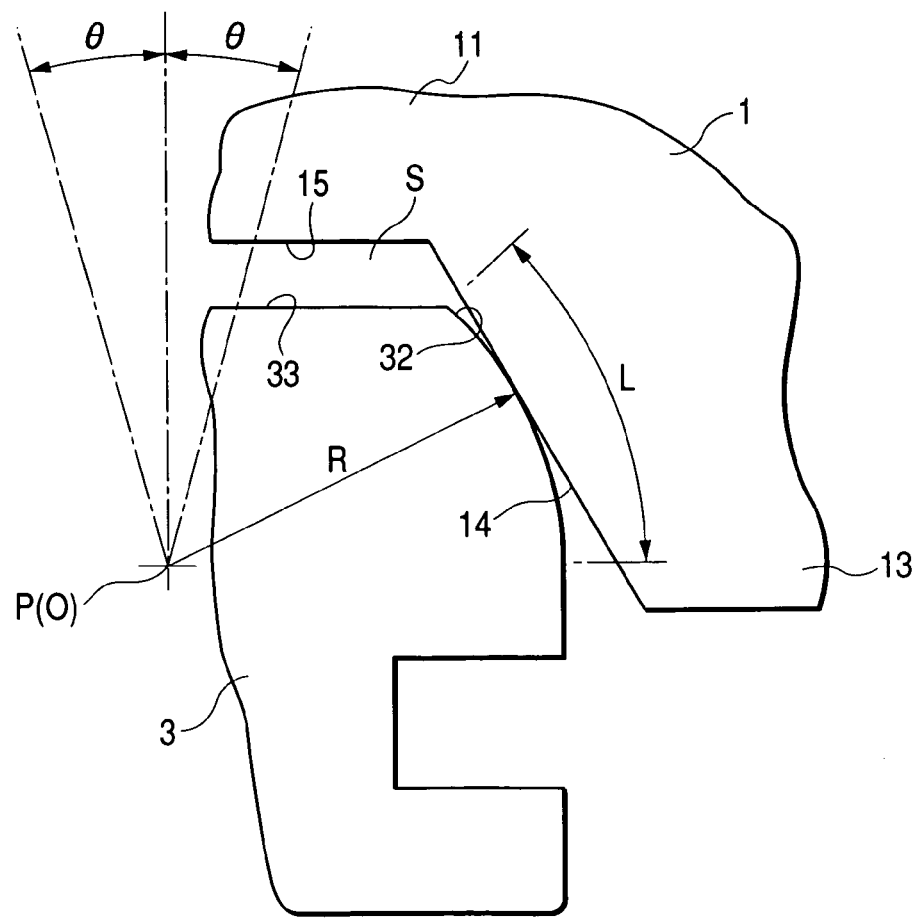
FIG. 5 illustrates the operation of the present invention.

The holder 3 has a circular through hole part 31 for attaching the laser diode 7 as a light source, and front parts of the right and left side surfaces thereof are formed as a pair of circular surfaces 32, 32 having a common center axial line. In FIG. 5, numeral L designates the forming range of the circular surface 32. As shown in FIG. 2, the holder 3 is fitted into a mutual space between the flat surfaces 14, 14 of the base member 1. When the right and left circular surfaces 32, 32 are abutted on the right and left flat surfaces 14, 14 of the base member 1 by fitting the holder 3 into the mutual space between the flat surfaces 14, 14 of the base member 1, a clearance S is formed between a front surface 33 of the holder 3 and the inner surface 15 of the front wall 11 of the base member 1. In the present embodiment, while the pair of right and left flat surfaces 14, 14 of the base member 1 are made a receiving surface, an abutting part abutted on the receiving surface is formed by the pair of right and left circular surfaces 32, 32 of the holder 3.

As shown in FIGS. 2, 3 and 4, the laser diode 7 has a circular collar-shaped part 71. A reentrant 72 formed at one point along the circumferential direction of the collar-shaped part 71 is fitted into a positioning protrusion 34 provided at the lower part of the through hole part 31 of the holder 3 shown in FIG. 1B and FIG. 3. In addition, the collar-shaped part 71 is overlapped with an annular stepped surface 35 formed in the through hole part 31, and thereby the laser diode 7 is positioned in a regular position relating to the holder 3.

The coupling tool 5 is a leaf spring material which is folded approximately in a U-lettered shape as viewed from the side. The coupling tool 5 is provided with a pair of rectangular plate pieces 51, 51 opposing each other in an up-and-down direction, a pair of right and left vertically long plate pieces 52, 52 connecting the rear ends of the plate pieces 51, 51 mutually, front locking pieces 53, 53 respectively provided at the front ends of the plate pieces 51, 51 over the whole length, and a rear pressing piece 54 composed by projected pieces 55, 55 respectively provided at the center part of the rear ends of the plate pieces 51, 51. As shown in FIG. 4, the projected pieces 55, 55 are protruded forward.

The coupling tool 5 is used for connecting the holder 3 to which the laser diode 7 is attached with the base member 1. That is, as shown in FIGS. 2, 3 and 4, the circular surfaces 32, 32 which are the abutting portions of the holder 3 to which the laser diode 7 is attached are engaged between the right and left flat surfaces 14, 14 of the base member 1, and thereby the right and left circular surfaces 32, 32 are abutted on the flat surfaces 14, 14. In this state, the plate pieces 51, 51 of the coupling tool 5 are respectively provided at the upper side and lower side of the base member 1 and the holder 3. The front locking pieces 53, 53 of the coupling tool 5 are engaged with engaging surfaces 56, 56 formed in a recessing form on the base member 1. In addition, the vertically long plate pieces 52, 52 of the coupling tool 5 are overlapped with the rear face of the holder 3, and the projected pieces 55, 55 are elastically contacted with the collar-shaped part 71 of the laser diode 7. Thereby the base member 1 is connected with the holder 3 to which the laser diode 7 is attached. In this connecting state, the base member 1 and the holder 3 are elastically caught in a overlapping state by the front locking piece 53, 53 and the vertically long plate pieces 52, 52 of the coupling tool 7. Moreover, since the collar-shaped part 71 of the laser diode 7 is pressed to the annular stepped surfaces 35, 35 by the projected pieces 55, 55, the holder 3 is pressed to the base member 1. Therefore, the position of the light emission point P of the laser diode 7 is accurately determined. The light emission point P is inherently provided in the laser diode 7, and when a prescribed voltage is applied to the laser diode 7, the light emission point P is located at the center of the light emission area. The height size of the base member 1 is made the same as that of the holder 3 in the present embodiment. Therefore, the base member 1 and the holder 3 are elastically caught by the plate pieces 51, 51 of the coupling tool 5, and as a result, the base member 1 and the holder 3 are positioned and fixed such that neither the base member 1 nor the holder 3 move vertically.

Herein, the light emission point P of the laser diode 7 is set so as to be located on a center axis line O (see FIGS. 2 and 5) which is common in the pair of right and left circular surfaces 32, 32 provided in the holder 3 and extends vertically. The projected pieces 55, 55 forming the rear pressing piece 54 of the coupling tool 5 are elastically contacted with the collar-shaped part 71 of the laser diode 7 at the back of the center axis line O, and are respectively provided at both upper and lower sides of the light emission point P of the laser diode 7. In addition, the figures show that the profile lines of the elastically-connected parts 55a (see FIG. 2) of the projected pieces 55, 55 to the collar-shaped part 71 of the laser diodes 7 are formed in a circular shape.

As shown in FIGS. 2–4, in the light emitting unit A assembled, the position relationship of the base member 1, the holder 3 and the laser diode 7 is fixed by the press catch operation of the coupling tool 7 without attaching the laser diode 7 to the holder 3 by means of an adhesive or attaching the holder 3 to the base member 1 by means of the adhesive.

Next, operation procedures for matching the position of the laser diode 7 to an optical axis on which a necessary optical component such as an object lens is ideally arranged will be described.

A jig for positionally adjusting the light emitting unit A in the direction of a longitudinal axis Y (vertical direction) and in the direction of a lateral axis X (the right and left direction) shown in FIG. 3, and another jig for rotating the holder 3 in the direction shown by Yθ to the base member 1 are used for this operation.

That is, in the first step, the light emitting unit A is positionally adjusted in two axial directions of the longitudinal axis Y and the lateral axis X perpendicularly intersecting with the optical axis on which the optical components are ideally arranged and perpendicularly intersecting with each other by using the jig. The inclination angle of the laser diode 7 is adjusted by rotating the holder 3 in the direction shown by Yθ around the center axis line O passing the light emission point P of the laser diode 7 by using the jig after positionally adjusted in the two axial directions. In this case, since the light emission point P is located on the center axis line O which is the rotating axis line of the holder 3, the position of the light emission point P is not changed in the operation for adjusting the inclination angle. As shown in FIG. 5, at this time, the inclination angle is adjusted by rotating the holders 3 to either of the right and left within the right and left rotating angle of θ allowed by the clearance S between the front surface 33 of the holder 3 and the inner surface 15 of the front wall 11 of the base member 1.

The right and left circular surfaces 32, 32 of the holder 3 are abutted on the right and left flat surfaces 14, 14 of the base member 1 on the overlapping place of the base member 1 and the holder 3 at the time of the operation for adjusting the inclination angle of the laser diode 7. Moreover, the separating distance from the center axis line O passing the light emission point P of the laser diode 7 in parallel with the longitudinal axis Y is set to a constant distance in the circular surfaces 32, 32. Thereby, the inclination angle can be easily adjusted by sliding circular surfaces 32, 32 on the flat surfaces 14, 14. In addition, since the circular surfaces 32, 32 are respectively brought into linear contact with only the flat surfaces 14, 14, the circular surfaces 32, 32 slide on the flat surfaces 14, 14 smoothly, and thereby it is useful for adjusting the inclination angle more easily. The holder 3 is not vertically misaligned with the inclination angle adjustment since the holder 3 is positioned by the coupling tool 5 such that the holder 3 does not move in the direction of the longitudinal axis Y (vertical direction) to the base member 1 at the time of the inclination angle adjustment. In addition, since the projected pieces 55, 55 are elastically contacted with the right and left center part of the collar-shaped part 71 of the laser diode 6, the position of laser diode 7 after adjusting the inclination angle does not shift afterwards.

The base member 1 may be attached to the holder 3 and the holder 3 may be attached to the laser diode 7 by means of the adhesive after completing the position adjustment operation and the inclination angle adjustment operation in two axial directions.

The receiving surfaces of the base member 1 are the right and left flat surfaces 14, 14, and the abutting portions of the holder 3 are the right and left circular surfaces 32, 32 in the present embodiment. However, the receiving surfaces of the base member 1 may be circular surfaces obtained by constantly fixing the separating distance from the center axis line O, and the abutting portions of the holder 3 may be right and left corner parts having a roundness.

According to a first aspect of the invention, the optical pickup device includes: a plurality of types of optical components provided on an optical axis in line; and a light emitting unit which includes a base member and a holder for holding a laser diode as a light source, the holder attached to the back of the base member and aligned to the optical axis. The light emitting unit built in the optical pickup device by positionally adjusting the base member in two axial directions of a longitudinal axis and a lateral axis perpendicularly intersecting with the optical axis and perpendicularly intersecting with each other. In addition, the light emitting unit has a coupling tool as a leaf spring material integrally provided with front locking pieces and rear pressing pieces positioning and fixing the base member and the holder by elastically catching the base member and the holder. Abutting parts formed on the holder are abutted on receiving surfaces formed on the base member on the overlapping place of the base member and the holder, and the abutting portions slide with respect to the receiving surfaces around a center axis line passing the light emission point of the laser diode in parallel with the longitudinal axis. The rear pressing pieces of the coupling tool are projected pieces for making the abutting portions press the receiving surfaces via the laser diode by being elastically contacted with the laser diode at the back of the center axis line.

The configuration described above provides the advantage that the base member and the holder of the light emitting unit are positioned and fixed by the coupling tool as the leaf spring. The light emitting unit is accurately positioned to the optical axis by positionally adjusting the light emitting unit in two axial directions of the longitudinal axis and the lateral axis by using the jig. Subsequently, when the abutting part of the holder abutted on the receiving surface of the base member is made to slide around the center axis line passing the light emission point of the laser diode, the inclination angle of the laser diode is adjusted only in one direction without causing the positional deviation of the light emission point, and the light emission direction coincides with the optical axis. Moreover, the rear pressing pieces of the coupling tool are elastically contacted with the laser diode at the back of the center axis line, and are projected pieces for making the abutting portions press the receiving surfaces via the laser diode. The laser diode, the holder and the base member are integrally assembled such that the laser diode, the holder and the base member do not move easily by the adjustment of the inclination angle of the laser diode.

In the above configuration, it is preferable that the coupling tool has a pair of plate pieces opposed in the direction of the longitudinal axis. In addition, it is preferable that the base member and the holder are respectively held by the plate pieces, and the base member and the holder are relatively positioned in the direction of the longitudinal axis.

Therefore, the base member and the holder are accurately positioned in the direction of the longitudinal axis by the coupling tool.

In the above configuration, it is preferable that the projected pieces are provided at both sides of the light emission point of the laser diode. Therefore, the inclination angle of the laser diode can be stably adjusted.

In the above configuration, it is preferable that the profile lines of the elastically-connected parts of the projected pieces to the laser diode are formed in a circular shape. Therefore, since the elastically-connected parts of the projected pieces are abutted on the laser diode in a point contact state, the inclination angle of the laser diode can be adjusted with a small force, and the laser diode is fixed to the position after adjusting it as it is.

In the above configuration, the receiving surfaces may be a pair of flat surfaces having a prescribed open angle. In addition, the abutting portions may be engaged between the pair of flat surfaces, and have a circular surface obtained by constantly fixing the separating distance from the center axis line. Therefore, since the holder is smoothly rotated against the base member, the inclination angle of the laser diode can be smoothly adjusted with a small force.

The optical disk device according to the present invention will be further embodied by employing the following configuration. That is, the optical pickup device according to the present invention includes: a plurality of types of optical components provided on an optical axis in line; and a light emitting unit which includes a base member and a holder for holding a laser diode as a light source, the holder attached to the back of the base member and aligned to the optical axis, the light emitting unit built in the optical pickup device by positionally adjusting the base member in two axial directions of a longitudinal axis and a lateral axis perpendicularly intersecting with the optical axis and perpendicularly intersecting with each other, wherein the light emitting unit has a coupling tool as a leaf spring material integrally provided with: a pair of plate pieces opposed in the direction of the longitudinal axis; front locking pieces provided at the front ends of the plate pieces respectively; rear pressing pieces provided at the rear ends of the plate pieces respectively and positioning and fixing the base member and the holder by elastically catching the base member and the holder between the front locking pieces and the rear pressing pieces; and vertically long plate pieces connecting the pair of plate pieces, whereby the base member and the holder respectively are held by the pair of plate pieces of the coupling tool, and the base member and the holder are relatively positioned in the direction of the longitudinal axis, wherein abutting portions formed on the holder are respectively abutted on receiving surfaces formed on the base member on the overlapping place of the base member and the holder, and the receiving surfaces are respectively a pair of flat surfaces having a prescribed open angle, the abutting portions engaged between the pair of flat surfaces, and having a circular surface obtained by constantly fixing the separating distance from a center axis line passing the light emission point of the laser diode in parallel with the longitudinal axis, and wherein the rear pressing pieces of the coupling tool are elastically contacted with the laser diode at the back of the center axis line, are provided at both sides of the light emission point of the laser diode, and are projected pieces for making the abutting portions press the receiving surfaces via the laser diode, and the profile lines of the elastically-connected parts of the projected pieces to the laser diode are formed in a circular shape.

In accordance with the configurations described above, the base member and the holder holding the laser diode are held and integrated by using the coupling tool as the leaf spring material, and the light emitting unit is assembled. Therefore, the light emitting unit can be easily assembled without using extra parts such as screws and requiring skill. In addition, the inclination angle of the laser diode can be adjusted by rotating the holder around the center axis line passing the light emission point of the laser diode after the light emitting unit is positionally adjusted in two axial directions of the longitudinal axis and the lateral axis by using the jig. Since the light emission point of the laser diode does not cause the positional deviation when the inclination angle is adjusted, the position of the laser diode to the optical axis on which the optical components are ideally arranged can be accurately and easily adjusted. Also, the positional deviation of the light emission point existing in the laser diode when the inclination angle is adjusted can be absorbed, and the inclination of the laser diode to the optical axis can be accurately and easily adjusted. Therefore, the deviation of the projection intensity distribution of the object lens as the optical component can be corrected with a high degree of accuracy, and an accurate record or reproduction can be performed by scanning the disk recording surface.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. An optical pickup device comprising:
a base member having receiving surfaces formed on a backside thereof;
a holder having abutting portions formed thereon and abuts on the receiving surfaces, and holds a laser diode as a light source and configured to be attached to the backside of the base member, the laser diode being configured to emit a laser beam towards a front side of the base member along an optical axis of other optical components; and
a coupling tool includes a leaf spring member that is monolithically provided with front locking pieces and rear pressing pieces by which positioning and fixing the base member and the holder by elastically catching the base member and the holder,
wherein the base member is positionally adjusted to the optical axis in two axial directions of a longitudinal axis and a lateral axis, the longitudinal axis and the lateral axis both perpendicularly intersect with the optical axis and perpendicularly intersect with each other,
wherein the receiving surfaces and the abutting portions are formed in shapes that the abutting portions slide with respect to the receiving surfaces around a center axis line passing the light emission point of the laser diode, the center axis being in parallel with the longitudinal axis,
wherein the rear pressing pieces includes projected pieces that press the abutting portions towards the receiving surfaces by elastically contacting with a backside of the laser diode,
wherein the leaf spring member includes a pair of plate pieces opposed with each other in a direction of the longitudinal axis, wherein the plate pieces sandwich the base member and the holder and adjust relative position between the base member and the holder in a direction of the longitudinal axis, wherein the projected pieces are provided at both sides of the light emission point of the laser diode, wherein profile lines of the projected pieces where elastically contact to the laser diode are formed in a curved surface, wherein the receiving surfaces are formed in a pair of flat surfaces having a prescribed open angle, and wherein the abutting portions are engaged with the pair of flat surfaces, and have a circular surface obtained by constantly fixing the separating distance from the center axis line.

2. An optical pickup device comprising:

a base member having receiving surfaces formed on a backside thereof;

a holder having abutting portions formed thereon and abuts on the receiving surfaces, and holds a laser diode as a light source and configured to be attached to the backside of the base member, the laser diode being configured to emit a laser beam towards a front side of the base member along an optical axis of other optical components; and a coupling tool includes a leaf spring member that is monolithically provided with front locking pieces and rear pressing pieces by which positioning and fixing the base member and the holder by elastically catching the base member and the holder, wherein the base member is positionally adjusted to the optical axis in two axial directions of a longitudinal axis and a lateral axis, the longitudinal axis and the lateral axis both perpendicularly intersect with the optical axis and perpendicularly intersect with each other, wherein the receiving surfaces and the abutting portions are formed in shapes that the abutting portions slide with respect to the receiving surfaces around a center axis line passing the light emission point of the laser diode, the center axis being in parallel with the longitudinal axis, and wherein the rear pressing pieces includes projected pieces that press the abutting portions towards the receiving surfaces by elastically contacting with a backside of the laser diode.

3. The optical pickup device according to claim 2, wherein the leaf spring member includes a pair of plate pieces opposed with each other in a direction of the longitudinal axis, and wherein the plate pieces sandwich the base member and the holder and adjust relative position between the base member and the holder in a direction of the longitudinal axis.

4. The optical pickup device according to claim 2, wherein the projected pieces are provided at both sides of the light emission point of the laser diode.

5. The optical pickup device according to claim 2, wherein profile lines of the projected pieces where elastically contact to the laser diode are formed in a curved surface.

6. The optical pickup device according to claim 2, wherein the receiving surfaces are formed in a pair of flat surfaces having a prescribed open angle, and wherein the abutting portions are engaged with the pair of flat surfaces, and have a circular surface obtained by constantly fixing the separating distance from the center axis line, the circular surface having a focal point at the light emission point of the laser diode.

* * * * *